(No Model.)
E. WESTON.
METHOD OF AND APPARATUS FOR REGULATING THE ELECTRICAL TRANSMISSION OF POWER.
No. 291,445. Patented Jan. 1, 1884.
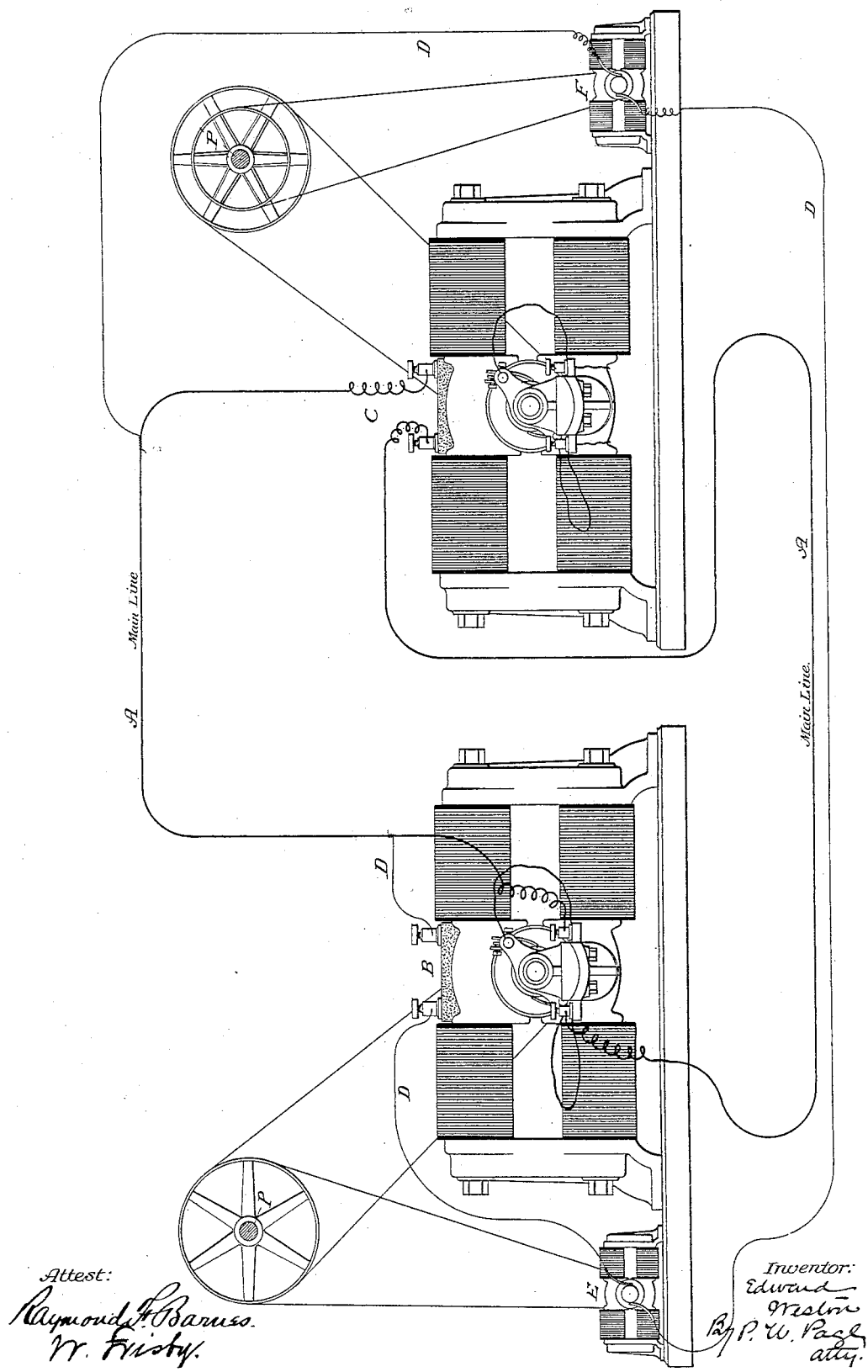

United States Patent Office.

EDWARD WESTON, OF NEWARK, NEW JERSEY, ASSIGNOR TO THE UNITED STATES ELECTRIC LIGHTING COMPANY, OF NEW YORK, N. Y.

METHOD OF AND APPARATUS FOR REGULATING THE ELECTRICAL TRANSMISSION OF POWER.

SPECIFICATION forming part of Letters Patent No. 291,445, dated January 1, 1884.

Application filed November 7, 1882. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Methods of and Apparatus for Regulating the Electrical Transmission of Power, of which the following specification contains a full, clear, and exact description, the present application being a division of an application filed by me May 8, 1882, Serial No. 60,706.

My invention relates to systems involving the conversion and transmission of power for general useful purposes, by the employment of dynamo-electric generators and motors, the invention having reference more particularly to a new method of effecting the regulation of the generator or generators with respect to the amount of current produced, whereby more or less current is generated as the load of the motor is increased or decreased, and its speed correspondingly varied, the object of the invention being to maintain as uniform a rate of speed in the motor as possible without loss of energy.

In certain patents granted to me on applications filed May 8, 1882, I have shown and described various specific ways of carrying out the invention. For instance, with a circuit including a generator and motor, I have combined electro-magnetic devices for interposing resistance in the field-circuit of the generator. I have also employed similar devices for shifting the commutator-brushes, and have produced similar results by other means, all of which operate to preserve the speed of the motor uniform by varying the amount of current given off by the machine proportionately to the load imposed upon the motor, and which involve as essential mechanical elements a generator, a working-circuit, a motor included therein, a regulating-circuit, and devices therein controllable at or by the motor for varying the current produced by the generator. In the present instance I effect this result by exciting the field of the generator by a current of constant electro-motive force, regulating the current flowing in said field by a counter electro-motive force, and varying the counter electro-motive force in proportion to the speed of the motor. The apparatus which I employ for this purpose and the conditions under which the same is employed are as follows:

In any given circuit I include the armature of a dynamo-electric machine and the armature and field of an electro-magnetic motor. The former is arranged to be driven at a practically-constant speed by a suitable source of power. By the same source of power I also drive a small dynamo-machine of very high electro-motive force, which I call the "exciter," the circuit of which is made to include the coils of the field-magnets of the main generator, and is then carried to a small machine, which I call for convenience the "opposer," and which at a given rate of speed has a lower electro-motive force than the exciter. The opposer is geared with the motor and connected up in such manner as to generate a current opposed to that of the exciter. To obtain the relative degrees of electro-motive force in the exciter and opposer, it is not necessary that they be of different construction, for they may be in every respect alike, but run at different speeds. For example, the pulley by which the exciter is driven may be of considerably greater diameter than that by which the opposer is run. This, together with the normal difference in the rate of speed of the two pulleys, will produce the desired effect.

The principle of operation of this system will be readily understood. The field of the generator will be energized by the current from the exciter, notwithstanding the opposition to this current from the opposer, for the reason that the electro-motive force of the latter is much less than that of the exciter. Should, now, the speed of the motor vary, by reason of a change of load or other cause, the speed of the opposer driven by it also varies, and more or less current will in consequence flow through the field-circuit of the generator, thus regulating the strength of the field-magnets and of the current generated by the machine. In this way the power transmitted from the generator to the motor will always be in proportion to work done. This method of regulation, when carried out by means of the instrumentalities which I have now described, involves, therefore, a main line including only a generator and motor, and an independent and parallel line for effecting the necessary regulation; and, as will be seen, this latter circuit may or may not be the means of exciting the field of the generator, according to the nature of the regulation.

The invention will be now described by reference to the accompanying drawing, wherein the system is illustrated by a diagram.

A A designate the conductors of a circuit supposed to extend from a source of electrical supply to a motor located at any desired distance from the same.

B is a dynamo-electric machine for furnishing current; C, a motor to be driven by the current.

D D is the parallel regulating-circuit, (one-half of this circuit may obviously be through one of the main conductors,) which includes a small machine, E, the field of the generator B, and a small opposer, F. Evidently the current for exciting the field of the generator may be derived from any other source which furnishes a current of normally constant strength.

P is the shaft, from which power is obtained to drive the main generator B and the exciter E.

P' is a shaft driven by the motor, and from this shaft power is derived for running the opposer F.

The invention, as described in connection with a single generator and one motor, is evidently applicable to systems including more than one generator and several motors, when the latter are employed conjointly.

The main advantages of the system result from the fact that the motor, which is often located at a great distance from the generator, is always supplied with the proper amount of current necessary for working under the most efficient conditions, and this without the introduction, as is usually the case, of dead-resistance in the main circuit.

In this application I have shown, in combination with a dynamo-electric machine, a device for producing counter electro-motive force in the field-circuit of said machine, and a motor for driving such device. This I do not specifically claim herein, as the same forms the subject of another application for Letters Patent.

What I claim is—

1. In a system for the electrical transmission of power, the combination of a generator, a motor, a circuit connecting the generator and motor, and an independent regulating-circuit, and means included therein, for controlling at the motor the current generated or power transmitted.

2. In a system for electrical transmission of power, the method hereinbefore described of regulating the current generated, which consists in exciting the field of the generator by a circuit of normally constant electro-motive force, regulating the amount of current flowing in said circuit by a counter electro-motive force and varying the counter electro-motive force in proportion to the speed of the motor, as set forth.

3. The combination, with a main line, a generator of electricity, and a motor included in the same, of an independent regulating-line parallel with the main and regulating devices included therein, the operation of said devices being made to depend upon the speed of rotation of the motor, substantially as and for the purpose set forth.

4. The combination, with an electric circuit, a generator driven at a constant rate of speed, and a motor, of an independent circuit, including the field-magnet coils of the said generator, a generator of relatively high electro-motive force included in said circuit and driven at a constant rate of speed, and an opposing generator of relatively low electro-motive force driven at a speed corresponding to that of the motor.

5. The combination, with a driving-engine, a generator, a motor, and a circuit including the motor and the armature of the generator, of an independent circuit, including the field-magnet coils of the generator, a generator of relatively high electro-motive force included in said circuit and connected with the driving-engine, and an opposing generator of relatively low electro-motive force connected with or driven by the motor, substantially as set forth.

In testimony whereof I have hereunto set my hand this 25th day of October, 1882.

EDWARD WESTON.

Witnesses:
PARKER W. PAGE,
W. FRISBY.